Feb. 25, 1969     G. H. JANTZEN     3,429,537
STRAP CONNECTOR
Filed Oct. 16, 1967
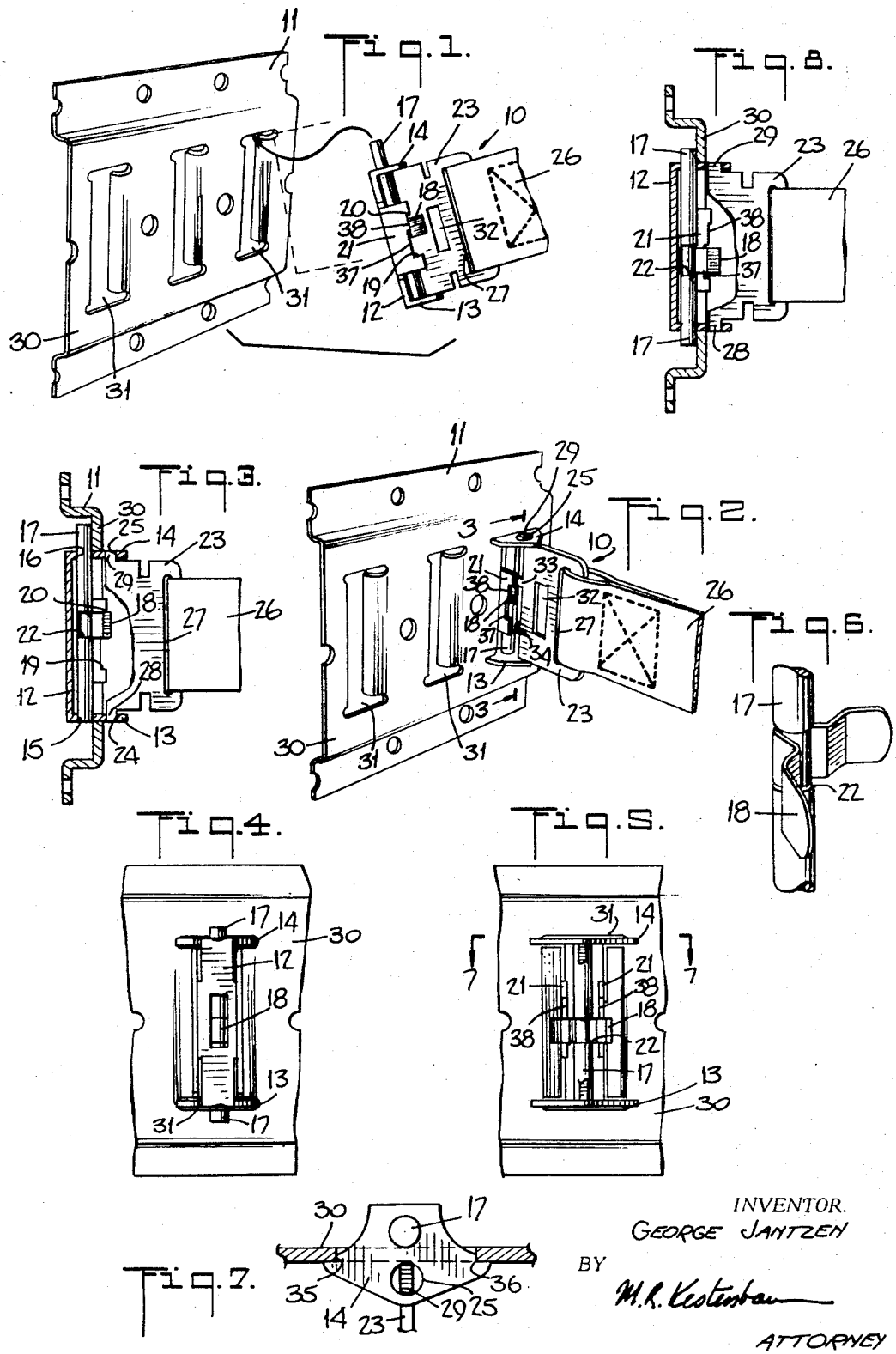
INVENTOR.
GEORGE JANTZEN
BY
M. R. Kestenbaum
ATTORNEY United States Patent Office 3,429,537
Patented Feb. 25, 1969

3,429,537
STRAP CONNECTOR
George H. Jantzen, New York, N.Y., assignor to M. Steinthal & Co., Incorporated, New York, N.Y., a corporation of New York
Filed Oct. 16, 1967, Ser. No. 675,389
U.S. Cl. 248—223                              12 Claims
Int. Cl. B60p 7/08; B61d 45/00

ABSTRACT OF THE DISCLOSURE

A pivotable connector for releasably securing a nylon cargo tie down strap to a slotted anchoring track in a vehicle. The connector frame has a slideable pin which is insertable in the slot and moveable to a position in which it extends at both ends beyond the slot to be retained against the inner surface of the track. A resilient arm, moveable with the pin, presses against a stepped wall to lock the pin in this position.

---

This invention relates to load controlling devices and more particularly to connectors for securing nylon tie down straps and the like to anchored tracks within a vehicle.

It is often necessary or desirable to secure cargo which is being transported within a vehicle to prevent it from shifting during transit. In truck trailers, for example, this is accomplished with the aid of nylon belts or straps, much like seat belts, which are connected at their ends to suitable tracks mounted along the trailer walls. One form of track which is used for this purpose consists of an elongated metal plate which usually is mounted to run horizontally along the track wall. The center portion or web of the plate is spaced from the face of the wall and has a series of vertical slots spaced at short intervals along its length. The strap connector is secured to the track by being inserted into any selected one of these vertical slots and engaging the rear surface of the web above and below the slot, in the space provided between the web and the surface of the wall. Once the connector is engaged in the track in this manner, some form of locking means is provided to keep the connector from disengaging the track while in use.

Connectors now in common use fail to achieve the useful potential which this track-connector arrangement offers. There are a significant number of shortcomings. For one, the connectors typically engage the track by dog ears which extend from the connector at top and bottom. Under heavy loading on the strap, these dog ears demonstrate a tendency to bend, permitting the connector to spring out of engagement with the track.

The locking means usually employed in these connectors is a second trouble spot. Typically, these do not come into play during the track engaging operation, so that the connector can be engaged in the track without being locked. On occasion, the failure to lock the connector has led to disastrous consequences. Moreover, typical locking means are arranged to work as intended only with the connector orientated in one predetermined direction. For example, the connector would not engage and lock in the track up-side-down so to speak, or engage and lock to hang down from a track mounted to the roof of the vehicle.

A third serious shortcoming of disengageable connectors relates to their tendency to cause the strap to wear prematurely at the place at which the strap is attached to the connector. One reason for this is that typically the connector has only a limited degree of pivotal freedom to either side from a position normal to the track. If in a particular load securing application it is necessary to lie the strap flush along or close to the face of the track, the strap will of necessity rotate at its place of attachment to the connector since the connector itself cannot rotate to a position flush with the track face. This rotation of the strap against the connector, usually against metal corners and often under some load, causes the strap to wear and limits its useful life and load bearing capacity.

Each of the above described shortcomings are overcome and a strap connector of greater load carrying capacity, security and flexibility of use is provided by the present invention for use with the form of track described above.

A frame is insertable in the track slots to extend into the space between the track web and the vehicle wall. A strong steel pin of high shear and bending strength is slideably mounted to the frame member to slide in the space between the wall and the web to a position in which it extends adjacent to the inner face of the web both above and below the slot. In this position the connector is engaged to the track. A finger gripped spring member is both the means for sliding the steel pin to the engaged position and for locking it in this position. Unless this member is actuated, the connector will not engage the track. And, when the member is actuated, it will be moved to a position locking the steel pin in engagement with the track. The strap is attached to a tongue member which is pivotably connected to the frame to rotate at the outer face of the web through nearly 180° of pivotable freedom. As a result, there is never the need for the strap to rotate with respect to the portion of the connector to which it is attached and this problem of excessive wear and resulting short strap life is overcome.

Accordingly, it is an object of the present invention to provide a strap connector for ready engagement and disengagement with a track for load securing applications.

Another object of this invention is a strap connector with nearly 180° of pivotable freedom at the outer face of the track with which it engages.

A further object of this invention is to provide a strap connector which will not cause the strap to which it is attached to wear prematurely.

An additional object of this invention is to provide a strap connector for use with a slotted track which connector possesses high load carrying capacities, particularly with respect to bending stresses.

A further object of this invention is to provide a strap connector for engagement with a slotted track which will not engage the track until a positive locking mechanism is intentionally actuated towards its locking position.

An additional object of this invention is to provide a strap connector which can be engaged and locked to a slotted track, in any spatial orientation of the track and whether the connector is right side up or inverted with respect to the track.

These and other objects and features of the present invention will be readily understood from the following detailed specification taken together with the drawing in which:

FIGURE 1 is an isometric view of the strap connector and the slotted track disengaged from each other.

FIGURE 2 is an isometric view of the strap connector inserted but not engaged in the track.

FIGURE 3 is a sectional view of the track and the connector taken through section line 3—3 in FIG. 2.

FIGURE 4 is a view of the inner face of the track with the strap connector inserted and engaged.

FIGURE 5 is a view of the outer face of the track and the strap connector with the portion of the connector which is attached to the strap removed.

FIGURE 6 is an isometric view of the hand gripped spring member.

FIGURE 7 is a sectional view of the track and the connector taken through section line 7—7 in FIG. 5.

FIGURE 8 is a sectional view of the track and the connector taken through the same section line as FIG. 3 except here the connector is shown engaged to the track.

Referring now to the drawing, the strap connector of the present invention is shown, generally as 10, together with the track 11 with which it engages. The connector 10 comprises a frame 12 having end walls 13, 14 with aligned apertures 15, 16 therein. A high shear and high bending strength steel pin 17 is positioned to slide in the apertures 15, 16. The travel of pin 17 is limited in both directions by virtue of the encounter by the resilient finger gripped spring member 18 with the stops 19, 20 on each of a pair of stepped flanges which extend from the frame 12 on both sides of the pin 17.

As shown in FIGURE 6, the spring member 18 is fitted to rest in a groove 22 located at about the mid portion of the pin 17. The resilient nature of the spring member 18 acting against the extending stepped flanges 21 keep the member 18 nested in the groove 22. In this way, movement of the spring member 18, within the limits set by the stops 19, 20 causes the pin 17 to slide within the frame 12.

In FIGURE 5, the connector 10 is shown engaged within the track 11, as viewed from the outer face of the track web 30. The strap and the tongue member of the connector to which it attaches have been removed to show the cooperation of the spring member 18 with the stepped flanges 21 which extend on both sides of the pin 17.

In normal operation, the ends of the spring member 18 can be squeezed together easily enough for it to clear the flanges 21 in going from the lower step 37 to the upper step 38 thereon.

However, an unusual amount of squeezing force is required to clear the stops 19, 20. Force of this magnitude is only applied purposefully in assembling or disassembling the connector.

A tongue member 23 is pivotably connected to the frame at a second pair of aligned apertures 24, 25. The strap 26 is attached to this tongue member 23 by passing through the slot 27 in the tongue member and being stitched to itself. The pivot axis of the tongue member tabs 28, 29 in the apertures 24, 25 is positioned to be at or slightly above the outer face of the web 30, of the track 11. As a result, the tongue member 23 (and hence the strap 26) will enjoy nearly 180° of pivotable freedom, from the outer face of the web 30 on one side of the slot 31 to the outer face of the web on the other side. Slot 32 in the tongue member 23 aids in this respect by permitting the ends of the spring member 18 to pass therethrough so as not to obstruct the strap from rotating to the outer face of the web.

A pair of tabs 33, 34 as shown in FIGURE 2, extend from the tongue member 23. These tabs extend close to the pin 17 when the tongue member is normal to the web 30. The purpose of these tabs 33, 34 will be explained hereinafter.

As shown in FIGURE 7, when the frame 12 is inserted in the slot 31, the frame seats itself in the relieved corners of the slot at a pair of notches 35, 36. These notches locate the position of the aligned pairs of apertures 24, 25 and 15, 16. Apertures 15, 16 are positioned on the portion of the frame 12 which is inserted in and through the slot 31. The location of these apertures is such as to position the pin 17 adjacent to inner face of web 30. Apertures 24, 25 are positioned on the portion of the frame 12 which remains external to the web 30. The importance of the location of these latter apertures is to locate the pivot axis of tabs 28, 29 for nearly 180° of pivotable freedom for the tongue member 23 and the strap 26, as has been previously described. As a result of this pivotable freedom there is little or no tendency for the strap 26 to rotate in the slot 27 at any angle of use. Less strap wear, higher capacity and longer strap life is the result.

The high strength steel pin 17 affords large resistance to bending and shear stresses which are set up in the connector, particularly under heavy shock load conditions. The loading on the pin 17 occurs as the load from the belt 26 is transmitted through the tongue member 23, via the tabs 28, 29, to the frame walls 13, 14 and thence along the portion of the frame 12 which is positioned behind the pin 17 relative to the web 30. Noting that prior connectors tend to fail due to bending stresses built up at the bases of the dog ears which engage the inner face of web 30, the pin 17 is supported against bowing outward and yielding at its mid-portion to large bending stresses by the tabs 33, 34.

The tabs 28, 29 on the tongue member 23 are fitted in apertures 24, 25 to present essentially in-line loading between the tongue member and the walls 13, 14. The bending stresses on these tabs are minimized. They encounter principally shear stress, which they can well withstand beyond the load bearing capacity of the commercial straps used for cargo tie down purposes.

The engagement and disengagement of the strap connector 10 with the track 11 will now be described. The ends of the spring member 18, to engage the connector 10 are squeezed towards each other to enable the spring member 18 to be moved from the lower step 37 to the upper step 38 of the stepped flange 21 (if the spring member 18 were not already at the upper step 38). In this position the pin 17 extends its maximum distance through end wall 14 at one end, and is flush with end wall 13 at the other end.

Referring to FIGURE 1, by angling the connector 10 with respect to the web 30 (as shown in dotted lines) the frame 12 can be inserted in and partially through the slot 31. The pin 17 will lie adjacent the inner face of the web 30, as shown in FIGURE 3. Since the connector 10 is unsecured in the track 11 at the lower frame wall 13, the connector 10 will not retain engagement in the track 11 under the slightest load. The user will not be able to overlook this condition because the connector 10 will not support a load on the strap 26.

To lock the connector 10 in positive engagement with the track 11, the spring member 18 is moved from the upper step 38 to the lower step 37 which moves the pin 17 downward to a position wherein it extends adjacent the inner face of web 30 from both upper and lower frame walls 14 and 13 as shown in FIGURES 4 and 8. The spring member 18, by virtue of the natural bias of its ends to spread further apart, will remain locked in the lower step 37 until again squeezed by the user. In this condition, the connector 10 will remain positively locked and securely engaged in the track 11 regardless of the spatial orientation of the track 11 or whether the connector 10 is inserted right side up or upside down.

The procedure for disengaging the connector 10 from the track 11 retraces the steps discussed above, going from the condition shown in FIGURE 8 to that shown in FIGURE 3 and then to FIGURE 1.

Although my invention has been described with reference to a specific embodiment, it should be understood that numerous modifications and changes may be made to this embodiment by one skilled in the art without departing from the spirit and teachings of my invention.

What is claimed is:

1. A connector for releasably engaging a strap to an anchor member having at least one opening therein for access to retaining surfaces thereof comprising:
   (a) a frame member having a pair of spaced supports thereon, each of said supports having one of a pair of aligned apertures therein,
   (b) a pin slideably mounted in said apertures and adapted to extend concurrently beyond both of said supports,
   (c) means for reciprocally sliding said pin in said apertures to increase the extension of said pin beyond each one of said supports alternately while decreasing the extension of said pin beyond the other of said supports,
(d) means for locking said pin in position extending concurrently beyond both of said supports, and
(e) a strap attaching member pivotably mounted to each of said supports, said connector being adapted for partial insertion through said opening whereby the extending portions of said pin will lie adjacent said retaining surfaces of said anchor member.

2. A connector in accordance with claim 1 in which said locking means comprises:
(a) wall means extending from said frame member running generally in the direction of movement of said pin and having a slotted portion thereon, and
(b) spring biased means in operable contact with said pin for movement therewith biased towards contact with said wall means and adapted to rest against said slotted portion when said pin is in position extending concurrently beyond both of said supports.

3. A connector in accordance with claim 2 in which stops on said wall means limit the reciprocal movement of said spring biased means in each direction.

4. A connector in accordance with claim 2 in which said locking means comprises a pair of said wall means having said pin positioned therebetween and said spring biased means comprises a pair of spring biased arms a separate one of which is biased towards contact with a separate one of said wall means.

5. A connector in accordance with claim 2 in which a resilient arm of said spring biased means provides said means for said movement of said pin.

6. A connector in accordance with claim 1 for engagement with an anchor member having at least one slotted opening therein comprising means for seating said frame member in said slot, said strap attaching member having a pivot axis through said supports which lies at least at the outer surface of said anchor member.

7. A connector in accordance with claim 6 in which said pivot axis lies outside the outer surface of said anchor member.

8. A connector in accordance with claim 1 in which the pivot axis of said strap attaching member is substantially parallel with said pin, said strap attaching member has tab means thereon which extend close to said pin when said strap attaching member is substantially normal to said anchor member.

9. A connector in accordance with claim 4 in which said strap connecting member has an aperture therein for permitting said arm of said spring biased means to pass therein.

10. A connector in accordance with claim 1 for engagement with an anchor member having at least one slotted opening therein for access to the inner surface thereof comprising:
(a) means for seating said frame member in said slot with said pair of aligned apertures inserted through said slot and adjacent said inner surface of said anchor member,
(b) said spaced supports having a second pair of aligned apertures therein, the centerline of said second pair of apertures being substantially parallel to the centerline of said first pair of apertures and adapted to lie external of said anchor member, and
(c) said strap attaching member having a pair of oppositely disposed tabs thereon for pivotable engagement in said second pair of slots with the pivot axis thereof external to said anchor member.

11. A connector in accordance with claim 1 in which said pin is slideable in said supports to a position substantially flush at one end thereof with one of said supports to enable insertion of said frame member through said opening.

12. A connector in accordance with claim 2 in which said wall means has a pair of stops thereon, said slotted portion being positioned between them and close to and remote from respective ones of said stops, said pin being slideable in said supports to a position substantially flush at one end thereof with one of said supports by actuation of said spring biased means to a position along said wall means adjacent said one of said stops remote from said slotted portion.

References Cited

UNITED STATES PATENTS

| 2,845,680 | 8/1958 | Elsner | 24—265 |
| 2,970,850 | 2/1961 | Blunden | 280—179 |
| 3,205,834 | 9/1965 | Terlecky | 105—368 |
| 3,282,229 | 11/1966 | Elsner | 105—369 |
| 3,367,286 | 2/1968 | Jantzen | 105—369 |
| 3,377,040 | 4/1968 | Hansen | 248—119 |

ROY D. FRAZIER, *Primary Examiner.*

J. FRANKLIN FOSS, *Assistant Examiner.*

U.S. Cl. X.R.

280—179; 105—369